United States Patent [19]

Beal

[11] Patent Number: 4,483,003
[45] Date of Patent: Nov. 13, 1984

[54] FAST PARITY CHECKING IN CACHE TAG MEMORY

[75] Inventor: David D. Beal, Boulder, Colo.

[73] Assignee: AT&T Bell Laboratories, Murray Hill, N.J.

[21] Appl. No.: 400,459

[22] Filed: Jul. 21, 1982

[51] Int. Cl.³ .............................................. G06F 11/10
[52] U.S. Cl. ..................................................... 371/51
[58] Field of Search ..................................... 371/49, 51

[56] References Cited

U.S. PATENT DOCUMENTS 3,789,204 1/1974 Barlow .................................... 371/51
4,197,580 4/1980 Chang et al. ......................... 364/200

OTHER PUBLICATIONS

IBM Technical Disclosure Bulletin, Distributed Address Checking, F. J. Aichelmann, 4/76, vol. 18, No. 11.
IBM Technical Disclosure Bulletin, Microcode Integrity Checking, P. Favre, Apr. 1978, vol. 20, No. 11B.

Primary Examiner—Jerry Smith
Assistant Examiner—Mark Ungerman
Attorney, Agent, or Firm—J. W. Herndon; S. J. Phillips

[57] ABSTRACT

A parity checking arrangement for tag information in a cache memory. Parity generation is performed on the input tag in parallel with tag memory lookup and then compared with the parity stored in tag memory in order to speed operation. A single parity generator also may be used for writing into tag memory.

5 Claims, 5 Drawing Figures

FAST PARITY CHECKING IN CACHE TAG MEMORY

TECHNICAL FIELD

This invention relates to data processing systems and more particularly, to data processing systems using cache memory.

BACKGROUND OF THE INVENTION

A cache is a memory that is functionally located between a data processor and its main memory. The cache is smaller but faster than the main memory. A cache memory decreases the effective access time of a memory system by storing copies of data that are also present in main memory. Here, the term "data" may include both program instructions and the data that they manipulate. Because of its size, the cache cannot hold copies of all of the main memory contents. When the processor performs a memory read operation, the cache tests to see if it contains the referand. If so, the cache will provide it to the processor, and no main memory access will occur. If the referenced data is not present in the cache, main memory will be accessed. References which find their target in the cache are called cache hits. All other memory references are called cache misses.

A main memory address consists of two fields. The higher order bits are called the tag field, while the remaining lower order bits are the index field. The cache uses a tag memory, separate from its data memory, to remember the tag fields of the addresses of the main memory contents that it presently holds. When the processor performs a memory access, the index field of the address is used to address the tag memory. The output data from the tag memory is then compared bit by bit with the tag field of the main memory address. If the two fields are identical, a hit has occurred, and the corresponding data will be supplied to the processor. If the fields are not identical, it is a miss, and main memory must be accessed.

If contents of the tag memory were to become corrupted, memory accesses that should miss may actually hit. This would result in incorrect data being supplied to the processor, a dangerous occurrence. Therefore, it is desirable that some method of error checking be performed over the tag fields when they are output from the tag memory. It is common to use a single parity bit over each word in the tag memory. If bad parity is detected when tag memory is read, a miss condition is forced. In the prior art, a parity check on the tag information is performed after the tag information is read from tag memory. This serial action slows the cache memory. It would be beneficial if this serial action could be replaced by a faster arrangement.

SUMMARY OF THE INVENTION

Cache memory action is speeded by generating a parity bit over the tag field supplied by the processor, and comparing this bit with the parity bit stored in the tag memory. This permits tag memory access and parity generation to occur simultaneously, reducing overall response time. Circuitry is reduced by using a single parity generator for writing into tag memory.

DETAILED DESCRIPTION

Figure 1:
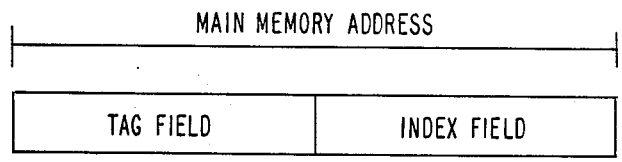
FIG. 1 shows the layout of a main memory address.

As shown in FIG. 1, a main memory address consists of two fields. The higher order bits are called the tag field, while the remaining lower order bits are the index field.

Figure 2:
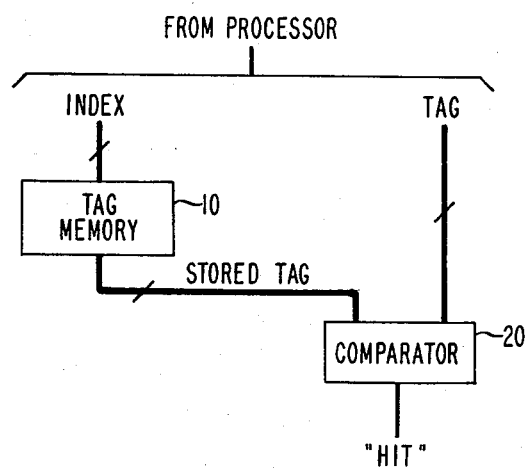
FIG. 2 shows tag access and comparison.

FIG. 2 shows the hardware of a cache typically necessary for hit or miss determination. The cache uses tag memory 10 separate from its data memory (not shown) to remember the tag fields of the addresses of the main memory contents that it presently holds. When the processor performs a memory access, the index field of the address is used to address the tag memory. The output data from the tag memory is then compared bit by bit with the tag field of the main memory address in comparator 20. If the two fields are identical, a hit has occurred, comparator 20 will produce a "hit" output signal, and the corresponding data will be supplied to the processor from data memory. If the fields are not identical, it is a miss, and main memory must be accessed. Added details of such a cache memory arrangement may be found, for example, in U.S. Pat. No. 4,197,580.

Figure 3:
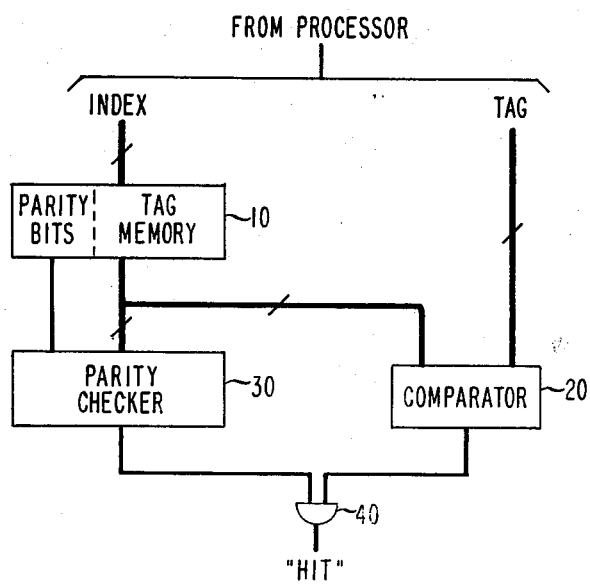
FIG. 3 shows a prior art tag memory comparison and parity check.

FIG. 3 shows a prior art arrangement for performing a parity check over the tag field. Tag memory 10 is accessed, and the resulting parity data is sent to a parity checker 30. The "hit" signal is the logical AND of the tag comparison of comparator 20 and the parity check. The major liability of this design is the fact that the tag memory access and the parity check—the slowest functions shown—are performed serially. Because the tag comparison is faster than the parity check, the critical path from processor address to the "hit" signal is the tag memory access plus the parity check plus the AND gate 40.

Figure 4:
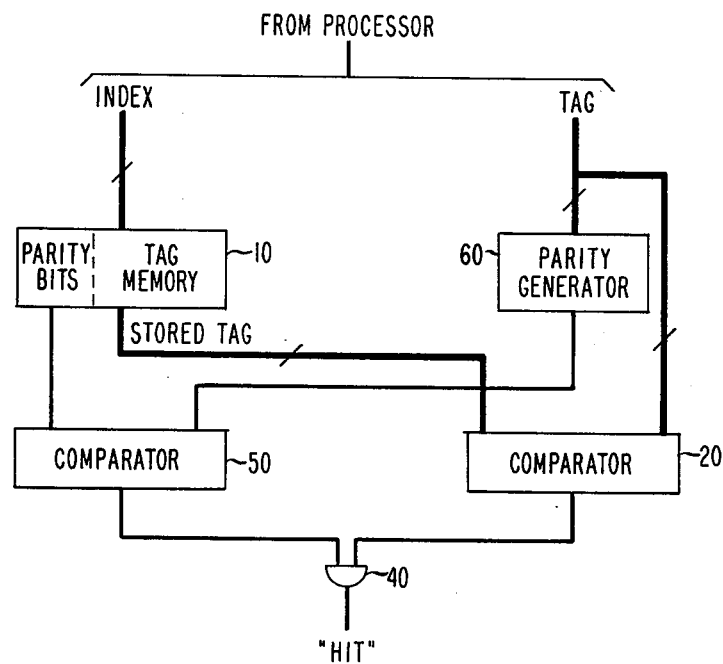
FIG. 4 shows an embodiment of the present invention.

FIG. 4 shows an implementation of the present invention. Here, a parity bit is generated in parity generator 60 over the tag field supplied by the processor. This bit is compared at comparator 50 with the parity bit stored in the tag memory 10. The tag fields from the processor address and the tag memory are also compared, as before, in comparator 20. Now, the "hit" signal is the logical AND of the tag comparison and the parity bit comparison. Therefore, this signal behaves the same as in the prior art design. That is, it will be asserted if, and only if, the tag fields match and the parity is correct over the stored tag. The advantage in the present embodiment design is that the tag memory access and parity generation occur simultaneously. Assuming that the parity generation is faster than the memory access, the critical path is now the memory access plus the tag comparison plus AND gate 40. The tag comparison has replaced parity checking in this equation. This results in faster cache operation.

Figure 5:
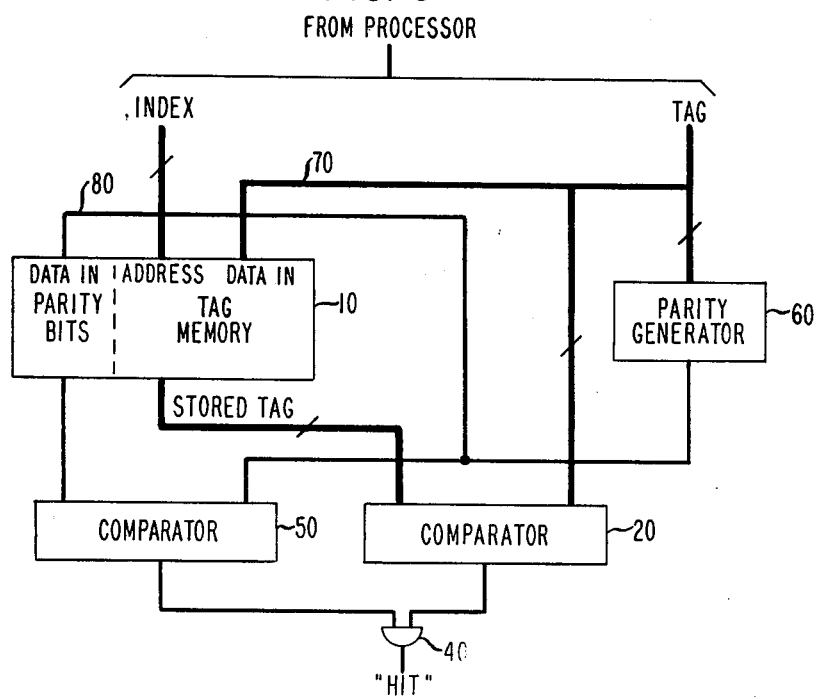
FIG. 5 shows a second embodiment of the present invention including means for writing parity bits into tag memory.

An additional asset of this arrangement can be seen when the tag memory 10 is to be written by the tag field supplied by the processor as shown in FIG. 5. The parity generator 60 is now well positioned to generate the parity bit which will be written into the tag memory over conducting path 80, along with the tag field from the processor over bus 70. In the prior art design, an additional parity generator would probably be required.

The implementations of the present invention as set forth herein are exemplary only and are not intended to be exhaustive. Other arrangements may be implemented by those skilled in the art without departing from the spirit of the invention.

What is claimed is:

1. In a cache memory, apparatus for determining a cache memory hit comprising:

storage means addressed by a prescribed part of a main memory address for retaining stored tag information which when compared to the remaining part of the main memory address describes a cache memory hit condition and for retaining stored parity information generated over the stored tag information, means for generating a parity bit over said remaining part of the main memory address on a main memory read operation simultaneously with the read operation, means for comparing said stored parity information with said generated parity bit, means for comparing said stored tag information with said remaining part of the main memory address, and means responsive to said two means for comparing for determining a cache memory hit.

2. Apparatus as set forth in claim 1 further comprising means responsive to said input tag information and said means for generating for writing said input tag information and said generated parity bit into said means for retaining.

3. A cache memory arrangement including a tag memory addressed by a prescribed part of a main memory address for containing stored tag information and stored parity information generated over the stored tag information, a parity generator for producing a parity bit in response to input tag information simultaneously with a read of the tag memory, a first comparator responsive to said tag information and said parity generator for producing an output when said parity bit and said stored parity information are the same, a second comparator responsive to said tag memory and said input tag information for producing a second output when said stored tag information and said input tag information are the same, and means responsive to said first and second comparators for producing a hit signal in response to said first and second outputs.

4. Apparatus as set forth in claim 3 further comprising means responsive to said parity generator and said input tag information for writing said parity bit and said input tag information into said tag memory.

5. Apparatus as set forth in claims 3 or 4 wherein said means responsive to said first and second comparators comprises an AND gate.

* * * * *